United States Patent [19]

Bierhoff

[11] Patent Number: 4,703,346

[45] Date of Patent: Oct. 27, 1987

[54] THREE-COLOR DRUM PRINTER WITH SPECIFIC RELATIONSHIP BETWEEN TRANSMISSION RATIO DRUM RADIUS AND INFORMATION CARRIER THICKNESS

[75] Inventor: Waltherus C. J. Bierhoff, Eindhoven, Netherlands

[73] Assignee: U.S. Philips Corporation, New York, N.Y.

[21] Appl. No.: 9,660

[22] Filed: Jan. 28, 1987

Related U.S. Application Data

[63] Continuation of Ser. No. 669,283, Nov. 7, 1984, abandoned.

[30] Foreign Application Priority Data

Sep. 3, 1984 [NL] Netherlands ........................ 8402680

[51] Int. Cl.[4] ........................ H04N 1/46; H04N 1/04; H04N 1/06

[52] U.S. Cl. ...................................... 358/75; 358/285; 358/293

[58] Field of Search ................. 358/75, 285, 289, 293, 358/75, 75 IJ, 78, 80

[56] References Cited

U.S. PATENT DOCUMENTS

| | | | |
|---|---|---|---|
| 2,295,572 | 9/1942 | Finch | 358/289 |
| 2,988,595 | 6/1961 | Magnusson | 358/289 |
| 3,781,902 | 12/1973 | Shim et al. | 358/289 |
| 4,161,749 | 7/1979 | Erlichman | 358/75 |
| 4,342,046 | 7/1982 | Kamata | 358/75 |
| 4,455,579 | 6/1984 | Tsukamura | 358/75 |
| 4,517,590 | 5/1985 | Nagashima et al. | 358/75 |
| 4,584,601 | 4/1986 | Suzuki et al. | 358/75 |

FOREIGN PATENT DOCUMENTS

| | | | |
|---|---|---|---|
| 122276 | 9/1981 | Japan | 358/75 |

*Primary Examiner*—James J. Groody
*Assistant Examiner*—Randall S. Svihla
*Attorney, Agent, or Firm*—Robert T. Mayer

[57] ABSTRACT

A color printer for printing a color image of sequential lines of three different base colors, with a drum having a length of sheet-like information carrier wrapped around it and secured thereto. A transmission means having a gear ratio is connected between a motor shaft and the drum for rotating the drum. The gear ratio of the transmission means, the drum radius and the thickness of the information carrier are so selected that for a whole number of revolutions of the motor shaft the drum moves a location on the information carrier a distance equal to $2(\pi R)+x$ from the position at which the location was when the motor started revolving wherein R is equal to the sum of the radius of the drum and the thickness of the information carrier and x is equal to the distance between two successive lines of different base colors in the printed color image.

6 Claims, 6 Drawing Figures

Figure 1:
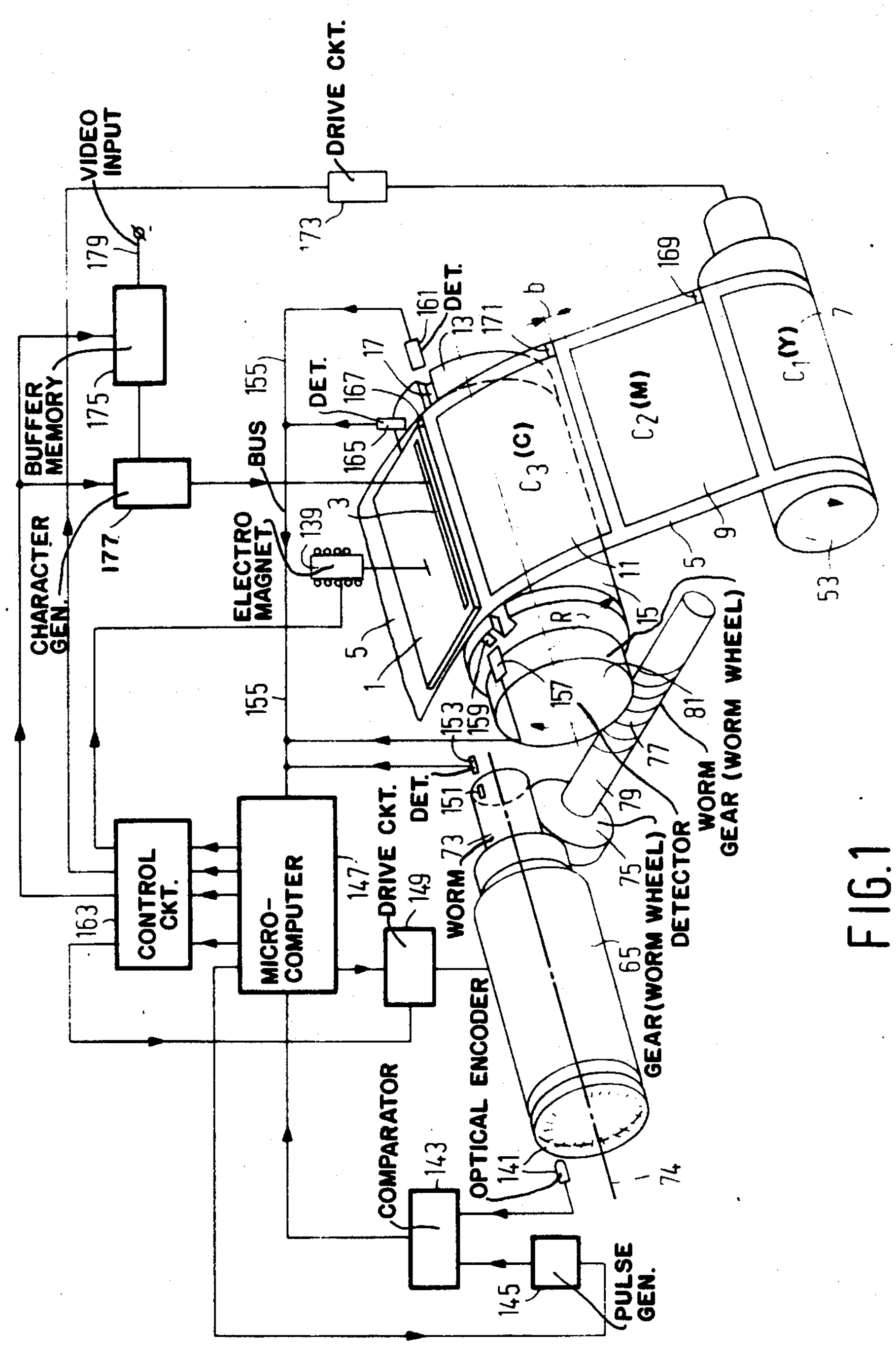

THREE-COLOR DRUM PRINTER WITH SPECIFIC RELATIONSHIP BETWEEN TRANSMISSION RATIO DRUM RADIUS AND INFORMATION CARRIER THICKNESS

This is a continuation of application Ser. No. 669,283 filed Nov. 7, 1984 now abandoned.

The invention relates to a colour printer comprising a row of printing members for printing a colour image composed of sequentially printed lines with image elements having different base colours and a circular-cylindrical drum which is rotatable along the printing members and to which a sheet-like information carrier is secured, the transport direction of the information carrier being at right angles to the lines with image elements.

The transfer of colour material to an information carrier by means of a colour printer can be effected both with and without a colour transfer strip. A known example of a colour printer without a colour transfer strip is the so-called ink-jet printer, in which drops of different colours are thrown onto the information carrier. Known colour printers in which use is made of a colour transfer strip are, for example, the thermal printers (inclusive of the so-called laser printers), the electrostatic printers and the printers operating with electromagnetically or electrodynamically driven impact members. The colour printer according to the invention can be used both with and without a colour transfer strip. In general, in colour printers a distinction has to be made as to the manner in which the colour formation on the information carrier takes place. This colour formation can be effected in that the centres of the image elements of different base colours are caused to coincide or in that these centres are separated from each other. The colour printer according to the present invention belongs to the class in which the centres of the image elements of different colours are separated from each other. The image elements in the printed colour image can then either be separated entirely from each other or can overlap each other in part. In this manner, so-called triplets comprising three image elements of different base colours are obtained, which may overlap each other, but whose centres are separated from each other. The colour image is then composed of parallel lines of different base colours at an equal mutual distance. It has been found in practice that it is difficult to keep the distance between successive lines in the printed colour image equal.

In a known colour printer of the kind mentioned in the opening paragraph (see British Patent Application No. 2,100,673), the colour image is printed in the stationary condition of the information carrier. The colour transfer is obtained by sublimation of colour material from a stationary colour transfer strip to the information carrier by means of a thermal printing head. The transport both of the information carrier and of the colour transfer strip is thus intermittent. The colour formation is obtained in that image elements of three or four different base colours are printed onto each other, whilst the centres of the various image elements coincide.

A disadvantage of the known colour printer is that both the information carrier and the strip with colour material (colour transfer strip) each time between two printing instants have to be accelerated and decelerated, as a result of which a comparatively complicated and expensive transport device is required. This also means that the drive of the drum with its comparatively large weight has to satisfy particular requirements.

It should be noted that U.S. Pat. No. 4,161,749 discloses a colour printer in which various kinds of printing members can be used. The information carrier is secured in this case to a drum rotating continuously during printing. During the printing of a complete colour image, the strip with colour material is stationary, however, so that a relative movement is performed between the information carrier and the strip with colour material. The resulting friction between the information carrier and the strip with colour material can lead to the colour material being smeared out. Also in this case the image elements of different base colours are printed onto each other, the centres of the image elements coinciding.

The invention has for its object to provide a colour printer, in which the said disadvantages are avoided.

A colour printer according to the invention is for this purpose characterized in that the ratio P between the number of revolutions per minute of a driving shaft driving the drum through a mechanical transmission and the number of revolutions per minute of the drum continuously rotating during printing satisfies the relations:

$$P=(3N-1)/3$$

and $$N=(2\pi R+X/3x)$$

N is equal to the maximum number of printed lines per base colour, R is equal to the sum of the radius of the drum and the thickness of the information carrier, x is equal to the distance between two successive lines of different base colours in the printed colour image and 3x is equal to the distance between two successive lines of the same base colour in the printed colour image.

In a colour printer satisfying the said mathematical relations, the printing principle essentially differs from that in the said known colour printers because the centres of the image elements of different base colours are now separated from each other. Otherwise, the printing of image elements with mutually separated centres is known per se, for example, from the so-called "offset printing technique", although in this case a quite different printing principle is used. Due to the fact that the information carrier is displaced each time over a distance 3x relative to the printing members at each revolution of the driving shaft during a continuous rotational movement of the drum the synchronization between the control of the printing members and the rotation of the drum can remain very simple. A detection of each complete rotation of the driving shaft is sufficient. After the drum has rotated over a distance $2\pi R-2x$, the motor shaft can still be rotated over one additional revolution in order to obtain the correct distance x between lines of different base colours in the printed colour image. Due to the given mathematical relation, in fact the drum and the information carrier will be subjected after a displacement of $2\pi R-2x$ to a further displacement of 3x as a result of the additional revolution of the motor shaft so that the overall displacement is $2\pi R+x$ and the printing of the next base colour can be started. The colour image obtained is composed of lines with image elements of different base colours which are successively printed and are located at a relative distance x on the information carrier. The lines with image elements of the same base colour are located on the information carrer at a relative distance 3x. When the successive lines of different base colours are printed successively at a relative distance x, so-called triplets with each time three different base colours are obtained, the centres of the image elements of such a triplet coinciding with the corner points of an isosceles triangle if the successive lines are printed so as to be relatively offset, viewed in a direction parallel to the line direction.

A preferred embodiment of a colour printer having a compact construction and operating with comparatively low noise is further characterized in that the driving shaft drives a first worm which is in engagement with a first worm wheel, which is secured together with a second worm on an intermediate shaft, while the second worm is in engagement with a second worm wheel which is coupled with the drum, the following relations being satisfied:

$$(Z_2 \cdot Z_4 / Z_1 \cdot Z_3) = (3N - 1/3)$$

and $$(Z_2 \cdot Z_4 / Z_1 \cdot Z_3) = 2\pi R / 3x$$

where:

$Z_1$ = the number of threads of the first worm, $Z_2$ = the number of teeth of the first worm wheel, $Z_3$ = the number of threads of the second worm and $Z_4$ = the number of teeth of the second worm wheel.

A further embodiment of the colour printer, which can be manufactured in a comparatively simple and inexpensive manner in mass production, is further characterized in that the printing members are located on a known thermal printing head, which during printing engages a strip located between the printing head and the information carrier with at least three areas of different base colours, while the printing head performs during printing a displacement relative to the drum whose direction encloses an acute angle $\alpha$ with the contact line of the printing head and the strip with base colours, the strip with base colours being displaceable by friction with the information carrier synchronously with the information carrier along the printing members in a direction at right angles to the lines with image elements.

Figure 2:
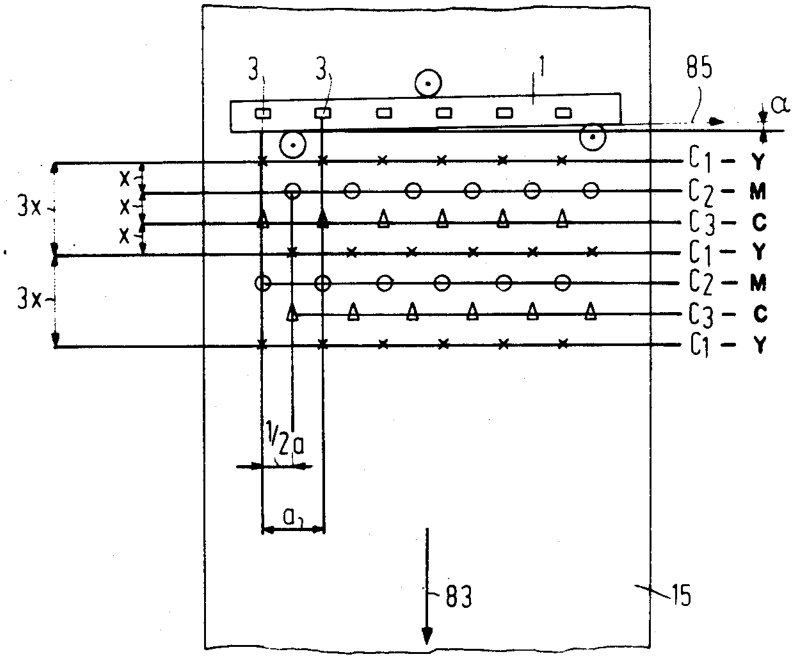
Figure 3:
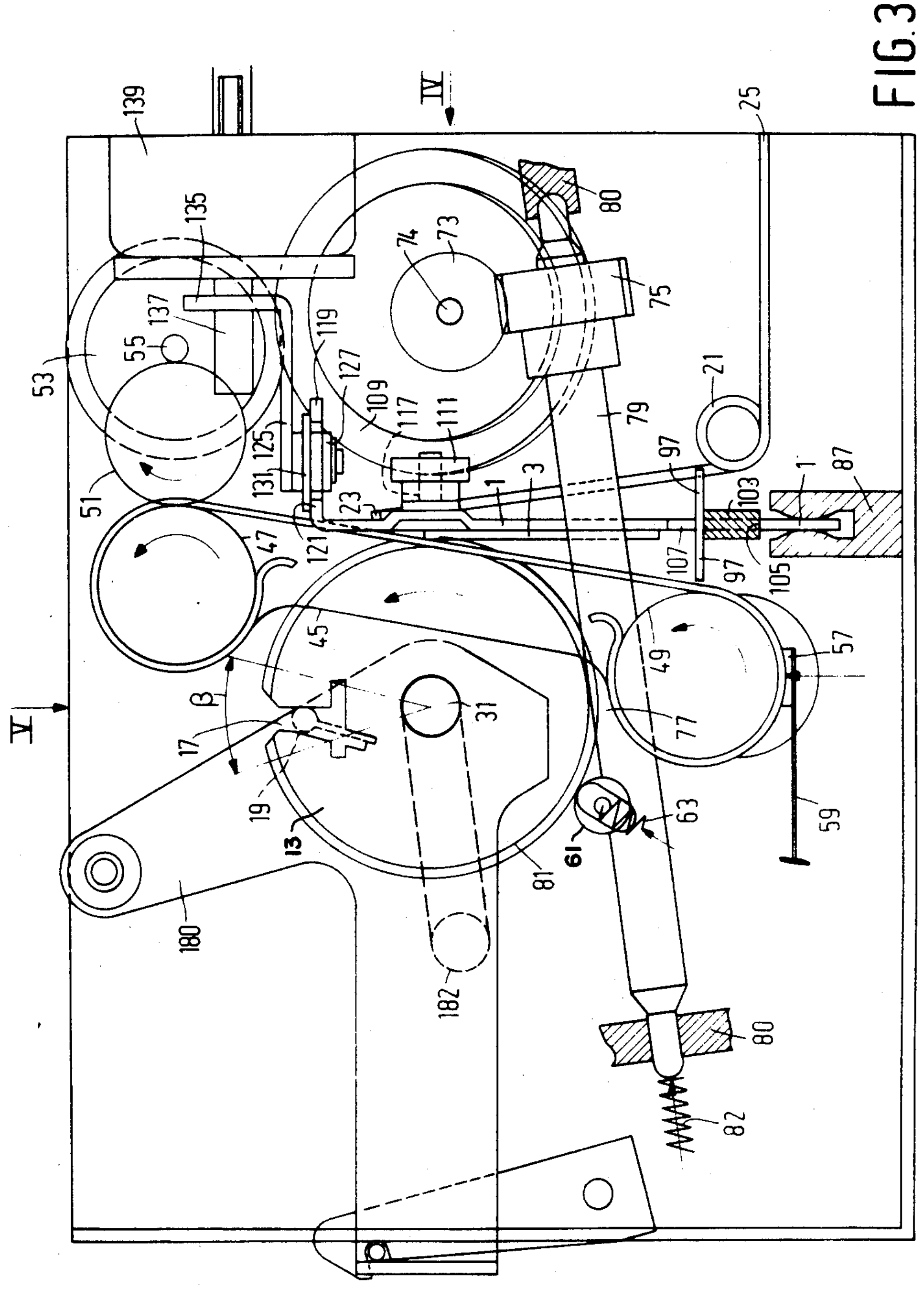
Figure 4:
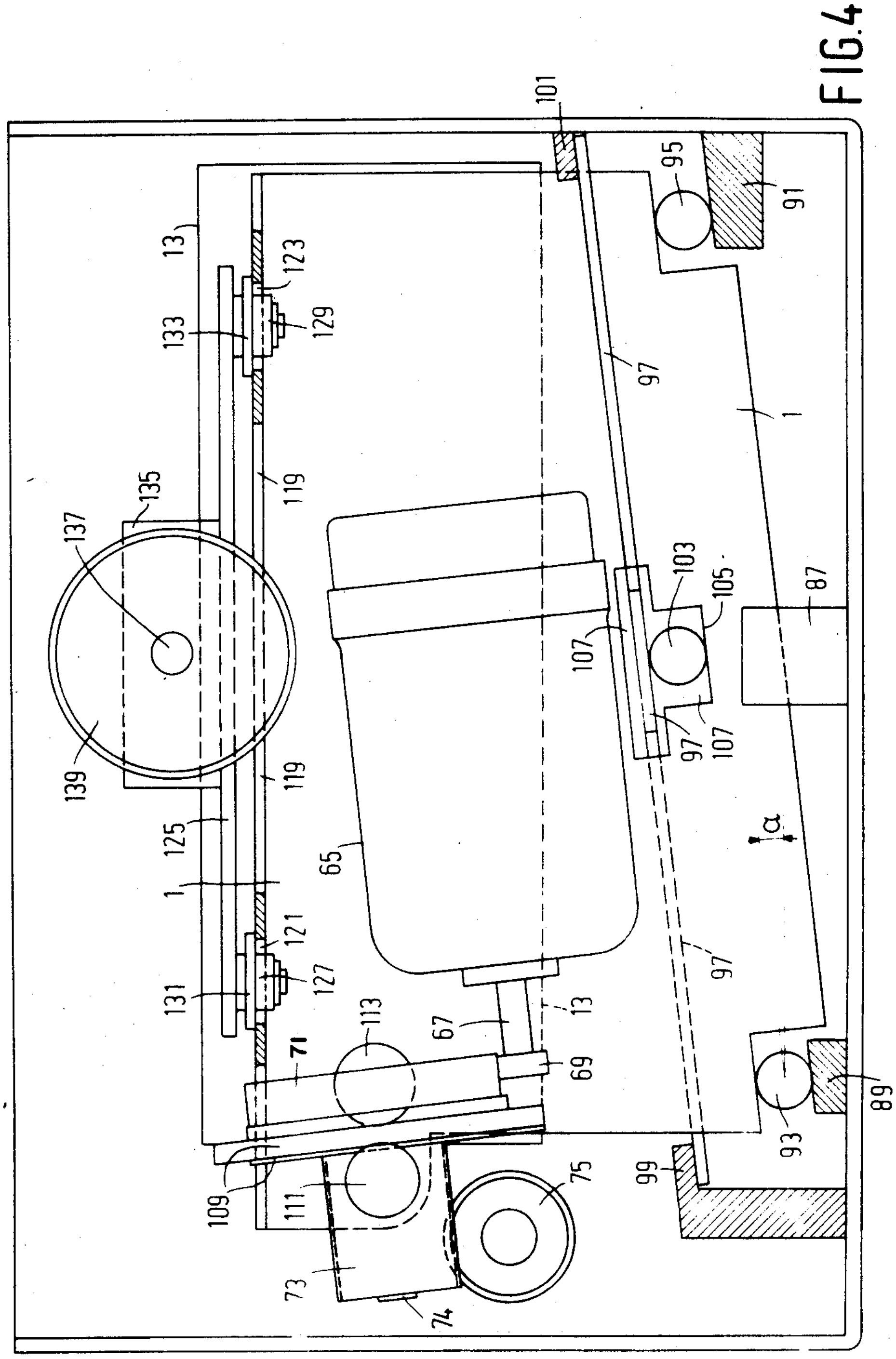
Figure 5:
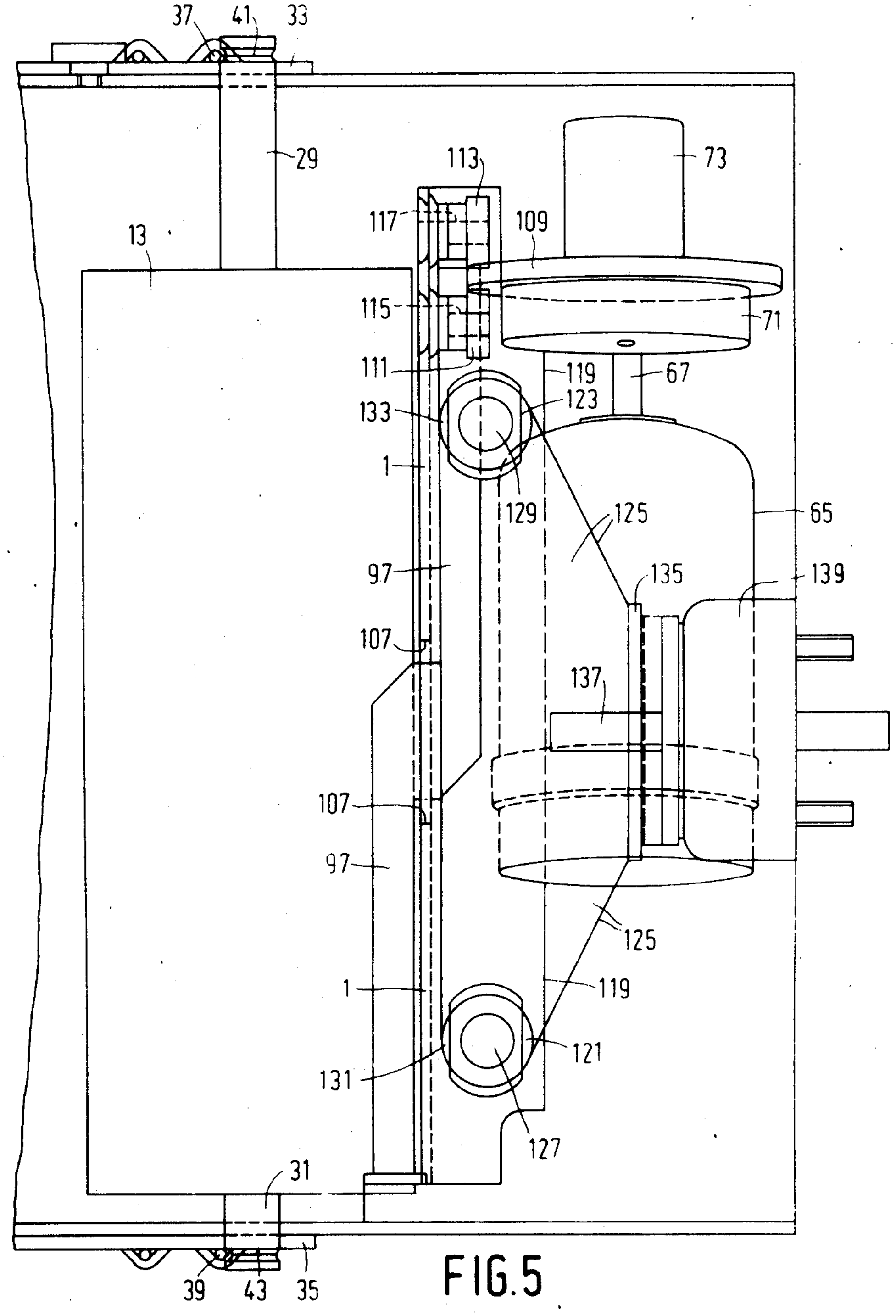
Figure 6:
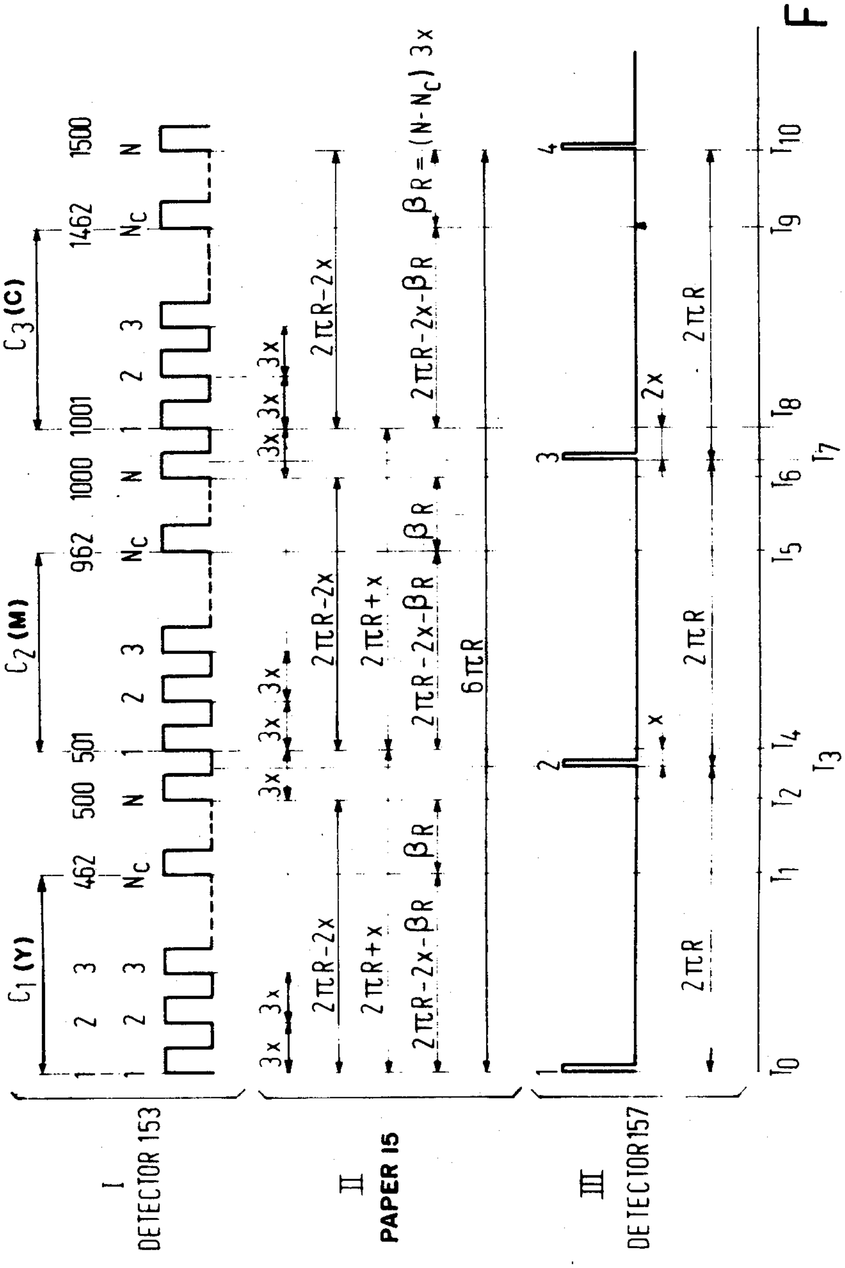

The invention will be described more fully with reference to the drawing, in which:

FIG. 1 is a diagrammatic perspective representation of the colour printer with its electric control in block diagram, FIG. 2 shows diagrammatically the printing principle of the colour printer, FIG. 3 is a side elevation of the colour printer without paper on its drum, FIG. 4 is an elevation taken on the arrow IV in FIG. 3, FIG. 5 is an elevation taken on the arrow V in FIG. 3, FIG. 6 shows a time diagram for printing one colour image.

The colour printer illustrated in FIGS. 1, 3, 4 and 5 comprises a thermal printing head 1 of a known kind having thermal printing members 3 in the form of electrically controlled (heated) resistance elements, which during printing engage a strip 5 with at least three areas 7, 9 and 11 of different base colours. The strip 5 constitutes a so-called colour transfer strip. In the present case, the base colours of the strip 5 for the areas 7, 9 and 11 are successively yellow, magenta and cyan. If desired, a fourth colour area with the colour black may be provided on the strip 5. A sheet-like information carrier 15 is located between the strip 5 and the outer surface of a rotatable circular-cylindrical drum 13. The information carrier 15 is constituted by a sheet of paper which is secured in a longitudinal slot 17 of the drum 13 by means of a clamping mechanism 19 (see FIG. 3), which for the sake of simplicity is shown diagrammatically. During printing, the strip 5 and the sheet of paper 15 are clamped between the outer surface of the drum 13 and the printing head 1 so that the printing members 3 engage the strip 5 with a given pressure. This pressure is obtained by means of a pre-stressed hold-down spring 21 (see FIG. 3). The hold-down spring 21 is formed from wire material and engages with its one free end 23 the printing head 1, while its other free end 25 is secured to a wall of the frame of the colour printer. The drum 13 is rotatably journalled with stub shafts 29 and 31 in side walls 33 and 35, respectively, of the frame of the colour printer (see FIG. 5). Pre-stressed wire springs 37 and 39, which are pressed into grooves 41 and 43 of the stub shafts 29 and 31, keep the journalling of the drum 13 free of clearance. The strip 5 with colour material is situated in a cassette 45 with a drivable take-up reel 47 and a supply reel 49 pulled along (see FIG. 3). During printing, a continuous rotation of the drum 13 takes plce. Each time when the longitudinal slot 17 in the drum 13 approaches the printing head 1, the latter has to be pulled away from the drum 13 against the tension of the spring 21 in order to prevent the printing head 1 from being damaged by the longitudinal slot 17. At the area at which the printing head 1 engages the strip 5, such a large friction occurs during printing between the paper 15 and the strip 5 that the latter is pulled along by the paper at the same speed as that of the paper. This speed is equal to the peripheral speed of the paper 15 on the side on which the paper engages the strip 5. The value of the parameter R indicated in FIG. 1 is equal to the sum of the radius of the drum 13 and the thickness of the paper 15. During printing, the strip 5 need consequently not be driven by a motor. Each time when the printing head 1 is pulled back, the strip 5 is driven when the longitudinal slot 17 passes the printing head. This is effected by means of a friction roller 51 which is in engagement with the take-up reel 47. The friction roller 51 is driven by an electric motor 53 via a driving roller 55. During printing, the electric motor is energized with a current whose value is a fraction of the current required for driving the friction roller 51 when the printing head 1 has been pulled back. Thus, it is achieved that also during printing, the strip 5 is held tight between the printing head 1 and the take-up reel 47. During the period in which there is no printing, the part of the strip 5 which is situated between the printing head 1 and the supply reel 49 remains tightened by a brake block 57 which engages the supply reel 49 and which is urged by a pre-stressed blade spring 59. The said lower part of the strip 5 is held tight during printing by the frictional force of the paper 15 lying on the strip 5 and by the braking force of the brake block 57. Between the printing head 1 and a pressure roller 61 the paper 15 is pulled tightly against the drum. The pressure force of the pressure roller 61 is obtained by means of a prestressed spring 63.

The drum 13 is driven by an electric motor 65 (FIG. 1) via a mechanical transmission, of which a part to be described further satisfies the aforementioned mathematical relation. There is secured on a motor shaft 67 (FIG. 4) a pinion 69 which is in engagement with a gear wheel 71 which is rigidly coupled with a first worm 73. The gear wheel 71 and the first worm 73 rotate by means of the same rotary shaft 74. In the present case, an electric motor 65 is used which has such a high number of revolutions of the motor shaft 67 that a reduction stage is required via the pinion 69 and the gear wheel 71. The pinion 69 and the gear wheel 71 may be dispensed with if an electric motor 65 is used which has an adapted lower number of revolutions. In this case, the first worm 73 could be secured on the motor shaft 67. It should be noted that in the situation shown diagrammatically in FIG. 1 the pinion 69 and the gear wheel 71 are in fact assumed to be absent and an electric motor 65 is assumed to be used which is adapted so that the first worm 73 can be driven by it without a reduction stage. Both in the situation of the drive via a reduction stage and in the situation with direct drive, the first worm 73 is in engagement with a first worm wheel 75 which is situated together with a second worm 77 on an intermediate shaft 79 (FIGS. 1 and 3) which is supported in bearings 80 and held therein without clearance by means of a compression spring 82. The second worm 77 is in engagement with a second worm wheel 81 which is rigidly coupled with the drum 13.

The ratio P between the number of revolutions per minute of the driving shaft 74 and the first worm 73, respectively, and the number of revolutions per minute of the second worm wheel 81 and the drum 13, respectively, satisfies the relations:

$$P=(3N-1/3)$$

and $$N=2\pi R+x/3x,$$

where $$P=(Z_2\cdot Z_4/Z_1\cdot Z_3).$$

In one example N=542, x=0.07, P=1625/3 and therefore R=18.1 mm.

The various parameters in the said mathematical relations have the following meaning:

N=the maximum number of printed lines per base colour,

R=the sum of the radius of the drum 13 and the thickness of the paper 15, x=the distance between two successive lines of different base colours in the printed colour image, and 3x=the distance between two successive lines of the same base colour in the printed colour image.

For explanation, the printing principle is indicated in FIG. 2 diagrammatically by the configuration of a number of printed lines with image elements. During each revolution of the driving shaft 74 and the first worm 73, respectively, the paper 15 is displaced over a distance 3x in the direction of the arrow 83 with respect to the printing head 1. Since the printing head 1 is guided about an angle α (see also FIG. 4) with respect to the line direction, with a continuously rotating drum 13 the image elements are nevertheless printed on a line which is at right angles to the direction of the arrow 83. The movement mechanism of the printing head 1 will be explained more fully. The image elements are printed during the forward stroke in the direction of the arrow 85 of the printing head 1. During the backward stroke of the printing head 1, there is no printing; however, this would be possible in principle. The stroke a of the printing head 1 in the line direction during the printing period is equal to the centre distance between two successive printing members 3 (resistance elements) on the printing head. During each reciprocating movement of the printing head 1, the paper 15 is displaced over the distance 3x. Due to a suitable time-shifted electronic control of the printing members 3, the image elements of two successive lines of the same base colour are printed so as to be shifted in the line direction over a relative distance ½a. The lines with image elements of the base colours yellow, magenta and cyan are indicated in FIG. 2 by $C_1$, $C_2$ and $C_3$, respectively. The colour areas 7, 9 and 11 corresponding to these lines with image elements are indicated in FIG. 1 also by $C_1$, $C_2$ and $C_3$. After the total number of lines in the first base colour yellow have been printed, the paper has been displaced over the distance $2\pi R-2x$ with respect to the printing head 1. When now the driving shaft 74 is caused to perform an additional revolution per base colour, the overall displacement of the paper 15 with respect to the printing head 1 becomes equal to $2\pi R-2x+3x=2\pi R+x$ so that the paper 15 is in the position for printing the first line in the second base colour magenta. The drum 13 then rotates continuously. The same procedure follows for printing the lines in the third base colour cyan. In the present case:

α=0.12 radians,
a=1.26 mm,
x=0.07 mm.

The distance x between two successive lines of different base colours with a continuously rotating drum 3 is therefore obtained fully automatically. An intermittent displacement mechanism for the paper 15 and the strip 5 is unnecessary. The drum 13 is stopped only after a complete colour image has been printed. When the drum 13 is turned back and the clamping mechanism 19 is unlocked (see FIG. 3), the paper can be removed in a usual manner from the colour printer.

It should be noted that in the colour printer described (see FIG. 3) a sector of β radians can not be utilized for printing. Although the sector β can be minimized by a suitable proportioning of the longitudinal slot 17 and an adapted construction of the clamping mechanism 19, a part of the periphery of the drum 13 will remain unsuitable for printing. It is to be preferred to pull the printing head 1 away from the drum 13 during each passage of the longitudinal slot 17. The aforementioned mathematical relation $P=(3N-1/3)$ is therefore related to the maximum number of lines N per base colour that could be attained with β=0, where a distance of $2\pi R-2x$ is utilized for printing each base colour. In practice, there has to be corrected for the fact that β is not equal to zero. This leads to a smaller number ($N_c$) than the maximum attainable number of lines (N) per base colour, where:

$$N_c=N-\beta R/3x.$$

Since in the considerations leading to the mathematical relations $P=(3N-1/3)$ and $N=2\pi R+x/3x$ the existence of a loss angle $\beta$ does not play a part, these relations remain valid also if $\beta$ is unequal to zero with respect to the ratio of the numbers of revolutions of the driving shaft 74 and of the drum 13.

In the present case, the printing head 1 is journalled and guided so that upon each passage of the longitudinal slot 17 the printing head can be pulled temporarily away from the drum 13. The plate-shaped printing head 1 is for this purpose slidably guided in a bearing 87 (see FIGS. 3 and 4) which allows tilting of the printing head 1. Furthermore the printing head 1 is held against two flat supports 89 and 91 (FIG. 4) via rollers 93 and 95. The engagement is obtained by means of a blade spring 97, which is engaged freely at its both ends by flat supports 99 and 101. At the centre, the blade spring 97 engages a roller 103 which is guided over a roller edge 105 of a window 107 in the printing head 1. The blade spring 97 is substantially free from stress in the situation shown and therefore serves only as a guide for the roller 103. Since the blade spring 97 is passed through the window 107 in the printing head 1 (see also FIG. 5), it is symmetrically located about window 107 of plate-shaped printing head 1. The reciprocating movement of the printing head 1 at an angle $\alpha$ is obtained by means of the same electric motor 65 by which the drum 13 is driven. The movements of the printing head 1 (translation) and of the drum 13 (rotation) are therefore mechanically synchronized. By means of a cam disk 109, which constitutes together with the gear wheel 71 and the first worm 73 an integral body which is mounted on the driving shaft, two relatively fixedly arranged rotatable rollers 111 and 113 are translated in a reciprocating manner at an angle $\alpha$ with respect to the axis of drum 13. The rollers 111 and 113 are rotatable about shafts 115 and 117 (FIG. 5), which are secured to the printing head 1. A rectangularly flanged limb 119 of the printing head 1 has two slotted holes 121 and 123, through which two shafts 127 and 129 are passed, which are secured to a coupling plate 125. The shafts 127 and 129 are provided with shoulders 131 and 133 which engage the limb 119. Since the shafts 127 and 129 are passed through the slotted holes 121 and 123 with clearance on all sides, the printing head 1 can perform a relative movement with respect to the shafts 127 and 129 both during printing and during the passage of the longitudinal slot 17 along the printing head. During the passage of the longitudinal slot 17 along the printing head 1, the latter is in fact pulled away from the drum 13, but the reciprocating movement at the angle $\alpha$ of the printing head continues. The coupling plate 125 is provided with a rectangularly flanged flap 135, which is secured to an armature 137 of an electromagnet 139. Upon energization of the electromagnet 139, the shafts 127 and 129 are pulled to the right through the clearance shown in FIG. 5 against the walls of holes 121 and 123 in the limb 119 of the printing head 1, as a result of which the printing head 1 is disengaged from the strip 5. The printing head 1 is disengaged by pulling against the pressure of the pre-stressed spring 21 (see FIG. 3).

The operation of the colour printer will now be explained with reference to the electric control shown blockdiagrammatically in FIG. 1.

The rotor (not visible) of the electric motor 65 is provided with an optical speed sensor 141 (optical encoder) of a known kind, which supplies a pulse sequence to a comparator 143. The frequency of the pulse sequence of the sensor 141, which is directly proportional to the number of revolutions of the electric motor 65, is compared in the comparator 143 with a reference pulse sequence originating from a pulse generator or clock 145 having a comparatively high accurately adjusted frequency. The comparator 143 supplies a difference signal to a known microcomputer 147, which transmits a control signal to the electric motor 65 via a known drive circuit 149. Thus far, the control is of a kind known per se. Instead of the separator clock 145, preferably the clock already present in the microcomputer 147 is used. The first worm 73 is provided with a marker 151 which upon each revolution of the driving shaft 74 is detected by a detector 153, which supplies pulses to the microcomputer 147 via a bus line or bus 155. At the beginning of the printing, also a starting pulse is supplied to the microcomputer 147 via the bus 155 by a further detector 157, which detects the presence of a marker 159 at the periphery of the drum 13. The marker 157 corresponds to the first printed line of the first base colour and is situated slightly behind the longitudinal slot 17, viewed in the direction of rotation of the drum 13. The presence of paper 15 in the longitudinal slot 17 is detected by a detector 161, which also supplies a signal to the computer 147 via the bus 155. This computer transmits via a control circuit 163 a signal to the electromagnet 139 at the instant at which the detector 157 detects the marker 159 and hence the position of the first printed line. The electromagnet 139 is bought into the de-energized condition before a line is printed. In the de-energized condition of the electromagnet 139, the spring 21 (see FIG. 3) urges the printing head 1 against the strip 5 with colour material. At the instant at which the electromagnet 139 is brought into the de-energized condition, the strip 5 also has to be in the correct position for the beginning of the printing. This is ascertained by means of a detector 165, which supplies via the bus 155 a signal to the computer 147 each time when one of a number of markers 167, 169 and 171 on the strip 5 is located opposite the detector 165. The strip 5 is provided with a marker at the beginning of each of the colour areas $C_1$, $C_2$ and $C_3$. The markers 167, 169 and 171 correspond to the base colours yellow, magenta and cyan, respectively. Just before the beginning of the printing, the marker 167 is located opposite the detector 161. For illustration, FIG. 1 shows the situation in which already three colour areas $C_1$, $C_2$ and $C_3$ have passed the printing head 1. It should be noted that the strip 5 may also be constituted by a sheet with only three colour areas $C_1$, $C_2$ and $C_3$. Via the control circuit 163 and a known drive circuit 173 of the same kind as the drive circuit 149 for the electric motor 65, the computer 147 controls the position of the strip 5 by driving the electric motor 53. The control of the printing members 3 is effected by means of a character generator 177 connected to a buffer memory 175. The buffer memory comprises the digital information which is required for printing a complete colour image and is fed from a video input 179. Briefly summarized, the situation at the beginning of the printing of the first line of the first base color is such that the detectors 153, 157, 161 and 165 supply a signal to the computer 147. The presence of the said four signals is the main condition for the beginning of the printing. Naturally, the printing head 1 therefore engages the strip 5 and the number of revolutions of the motor 65 is equal to the desired number of revolutions.

Hereinafter the process of printing one complete colour image will be described with reference to the time diagram shown in FIG. 6. The pulse sequence of the detector 153 is indicated in FIG. 6 in the sector I. The displacement of the paper 15 is indicated in the sector II of FIG. 6, while the pulse sequence of the detector 157 is indicated in the sector III of FIG. 6. Both the number of pulses per base colour and the total number of pulses for a complete colour image are indicated in the sector I. At the instant $T_0$, a first pulse of a sequence is supplied by the detectors 153 and 157. The first line of the first base colour yellow is printed at the instant $T_0=0$. After a complete revolution of the driving shaft 74 and of the first worm 73, respectively, the second pulse in the pulse sequence of detector 153 is supplied. During the first complete revolution of the worm 73, the paper 15 is transported over a distance 3x by the drum 13. Due to the friction of the paper 15 on the strip 5 with colour material, the strip 5 is also transported over the distance 3x at the first revolution of the worm 73. A suitable energization of the electric motor 53 ensures that during printing the part of the strip 5 between the printing head 1 and the take-up reel 47 (see FIG. 3) is held tight, but is not driven by the electric motor 53. In the relevant printer, the said maximum number of lines N per base colour is equal to 500, while the actually printed number of lines $N_c$ per base colour because of the sector $\beta$ is equal to 462. The printing of the base colour yellow terminates at the printing of the 462nd line when the 462nd pulse is supplied by the detector 153. At each revolution of the worm 73, the paper 15 and the strip 5 are transported over a distance 3x with respect to the printing head 1. At the instant $T_1$ at which the last line $N_c$ in the colour yellow is printed, the paper 15 and the strip 5 have been transported with respect to the printing head 1 over a distance which is equal to $2\pi R-2x-\beta R$. In the colour printer described, $x=0.07$ mm; $R=16.7$ mm; $\beta=0.471$ radians. At the instant $T_1$, so after 461 revolutions of the worm 73, the electromagnet 139 is energized so that the printing head 1 is pulled against the tension of the spring 21 away from the drum 13 until the strip 5 is disengaged from the printing head 1. Since the strip 5 is now no longer transported by the friction of the paper 15, at the instant $T_1$ the electric motor 53 is also energized with a larger current strength than before so that the strip 5 is driven by the electric motor 53. The transport by means of the electric motor 53 terminates at an instant lying before or at the instant $T_4$ to be described further. After $N-1=499$ revolutions of the worm 73, at the instant $T_2$ the $N^{th}$ or $500^{th}$ pulse is supplied by the detector 153. In the period $T_2-T_0$, the paper 15 is transported over the distance $2\pi R-2x$. With one more revolution of the worm 73 (so after N revolutions), the paper 15 is transported over an additional distance 3x. In the period $T_4-T_0$, the paper 15 is consequently transported over a distance $2\pi R+x$ with respect to a fixed reference point. Meanwhile, the detector 157 has supplied its second pulse at the instant $T_3$ after a complete revolution of the drum 13 in the period $T_3-T_0$. It will be clear that at the instant $T_4$ the paper 15 is in the correct position for printing the first line in the second base colour megenta of the colour area $C_2$. This position is shifted over the distance x with respect to the first line in the first base colour yellow.

The speed of transport of the strip 5 by the electric motor 53 in the period $T_4-T_1$ has to be such that at the instant $T_4$ the marker 169 of the colour area $C_2$ is located opposite the detector 165. If the distance between the successive colour areas is b, this means that the ratio between the speed of transport of the strip 5 and that of the paper 15 has to be equal to or larger than 1.26. This follows from the relation:

$$(V_c/V_a)=(b(\beta R+x),$$

in which:

$V_c$=speed of transport of strip 5 in period $T_4-T_1$,
$V_a$=speed of transport of paper 15,
b=10 mm.

At the instant $T_4$ the energization current of the electric motor 53 is reduced and the energization of the electromagnet 139 is terminated so that the transport of the strip 5 again takes place by the friction of the paper 15. The printing head 1 is then in fact urged again against the strip 5 and the paper 15 by the spring 21.

The pulse supplied at the instant $T_4$ by the detector marks the first printed line in the second base colour magenta. The process of printing the 462 print lines in the colour magenta is quite analogous to the process of printing the lines in the colour yellow. Therefore, the instants $T_5$, $T_7$ and $T_8$ correspond to the instants $T_1$, $T_3$ and $T_4$, respectively. The third pulse of the detector 157 is supplied at the instant $T_7$. The overall transport distance of the paper 15 at the instant $T_8$ is $4\pi R+2x$, which consequently corresponds to two complete revolutions of the drum 13 plus the distance 2x. As the marker 151 on the worm 73 has been subjected with respect to the marker 159 on the drum 13 at the instant $T_4$ to an angular rotation of (x/R) radians, this angular rotation is at the instant $T_8$ consequently already (2x/R) radians. The first line of the third base colour cyan is printed at the instant $T_8$. After 462 lines in the colour cyan, the instant $T_9$ is reached, at wich the complete colour image is printed. The paper 15 has now still to be transported over the distance $(N-N_c)\cdot 3x\beta R$ in order to obtain the fourth pulse of the detector 157 at the instant $T_{10}$. The drum 13 has performed at the instant $T_{10}$ three complete revolutions and is effectively again in the starting position for printing a next colour image. At the instant $T_{10}$, the detector 153 has supplied a total number of 1500 pulses. The instant $T_9$ corresponds to the instants $T_5$ and $T_1$ in such a manner that at these three instants the printing head 1 is pulled away from the paper 15, while the transport of the strip 5 is taken over by the electric motor 53.

The instant $T_{10}$ is the starting point for removing the paper 15 with the first colour image. When the drum 13 is turned back and the clamping mechanism 19 is then unlocked, the paper 15 is guided into an outlet not shown and is removed. The drum 13 is turned back over such a distance that the paper 15 will project beyond the said outlet and can be gripped so as to be removed manually. In this position of the drum 13, a new sheet of paper can also be inserted into the longitudinal slot 17 and can be clamped by means of the clamping mechanism 19. When now the paper is transported again over the same distance as was required for removing in the transport direction for printing the marker 159 on the drum 13 is brought again opposite the detector 157. The position of the drum 13 then again corresponds to the position the drum 13 occupied at the instant $T_0$. From the instant $T_0$ to the instant $T_{10}$, the markers 151 and 159 on the worm 73 and on the drum 13, respectively, have been subjected to a relative angular rotation which is about the distance 3x on the drum surface.

This means that the first print line of the second colour image shifts with respect to the first print line of the first colour image. This shift is acceptable. When a third colour image is printed, the said shift is further increased. This may be compensated for in that the drum is turned back. This compensation may be effected each time after printing two colour images.

It should be noted that the printing head 1 which is pulled away from the strip 5 and the paper 15 at the instant $T_{10}$ is not brought back again into the printing position until a new sheet of paper has been inserted and the strip 5 has been transported further by the motor 53 to the next marker 167 of the first base colour yellow. In the present case, a strip 5 is used on which an equal number of colour areas $C_1$, $C_2$ and $C_3$ are present. The total number of colour areas can therefore be divided by three. In case the strip 5 with a total number of only three colour areas $C_1$, $C_2$ and $C_3$ is used, the strip 5 must naturally have a length which is adapted to the distance between the take-up reel 47 and the supply reel 49. However, with such a short strip 5 it is to be preferred to use a transport mechanism of a different kind without a cassette 45. In this case, a number of strips 5 with each three colour areas $C_1$, $C_2$ and $C_3$ may be stored in the form of a stack in a magazine (see, for example, U.S. Pat. No. 4,161,749). After printing of each colour image, the relevant strip 5 then has to be removed. This can be effected synchronously with the removal of a printed sheet of paper 15.

Although the colour printer has been described with reference to an embodiment comprising a thermal printing head, the invention is not limited thereto. Thus, for example, it is possible to form a colour image in a direct manner by means of a known so-called ink-drop printing head. A colour transfer strip is no longer necessary in this case. Furthermore, it is possible to use an electrostatic printing head, a laser printing head or a printing head having electromagnetically or electrodynamically driven impact members. The last-mentioned three kinds of printing heads are also known per se and use a colour transfer strip of an adapted kind. In order to save colour material, the areas $C_1$, $C_2$ and $C_3$ may alternatively each be composed of a number of colour bars of the same base colour which are located at a relative distance 3x. Such a strip 5 can be manufactured only with comparatively great difficulty, however. In order to control the contrast in the colour image, a fourth colour area $C_4$ in the colour black can be provided on the strip 5. In this case, the black image elements are preferably printed onto the yellow image elements. Due to a suitable shaping of the clamping mechanism 19, an abrupt transition on the drum 13 at the area of the longitudinal slot 17 can be substantially completely avoided. In such an embodiment, the printing head 1 can continuously engage the strip 5. The number of print lines per sheet of paper can then be increased because the sector $\beta$ is in fact no longer present or is strongly reduced. The difference between N and $N_c$ then has also become smaller. In the period of time which corresponds to the area on the paper (which is always present in this case) on which there is not printed, the strip 5 is transported synchronously with the paper 15 by the friction of the paper on the strip, like during printing. A separate drive for the strip 5 may then be dispensed with.

In the embodiment described, the drum 13 is suspended in a lever mechanism 180 by means of which the drum 13 can be brought into a retracted position, which corresponds to the position 182 of the stub shaft 31 indicated by dotted lines in FIG. 3. In this position of the drum 13, a new cassette 45 can be inserted. The second worm wheel 81 remains in engagement with the second worm 77 during this procedure and effectively rolls over the second worm 77. A further description of the operation of the lever mechanism 180 is not given for the sake of brevity.

The principle of the invention is based on the very special transmission ratio between the driving shaft 74 and the drum 13. Whilst maintaining the described mathematical relation of the transmission ratio P, use may be made of all kinds of transmission mechanisms between the driving shaft 74 and the drum 13. Use may be made, for example, of belt transmission, gear belt transmissions, chain transmissions, transmissions with friction rollers or transmissions with gear wheels without the use of worms and worm wheels. The choice inter alia depends on the number of revolutions of the electric motor 65 and upon the requirements imposed with respect to the sound level. The two worms 73, 77 and two worm wheels 75 and 81 used in the embodiment described offer the advantage of an operation with very low noise with a comparatively large transmission ratio between the electric motor 65 and the drum 13.

Furthermore, it is to be stated that for the movement of the printing head 1 at right angles to the transport direction of the paper 15 a separate drive is possible. The synchronization with the rotation of the drum 13 can then be obtained by conventional electronic means. Finally, it should be noted that a fixedly arranged printing head may also be used. The triplets of image elements are then constituted by series of these image elements of different base colours located on one line.

What is claimed is:

1. A color printer comprising a row of printing members for printing a printed color image, said image comprising sequential lines of three different base colors, said printer including a circular cylindrical drum rotatable with respect to said printing members, said drum having a radius and a length of sheet-like information carrier wrapped around it and secured thereto, said information carrier having a given thickness and being movable under said printing members by rotation of said drum, a motor with a shaft and a transmission means having a transmission ratio and being connected between said motor shaft and said drum for rotating said drum in response to rotation of said motor shaft, wherein the transmission ratio of said transmission means is so selected that a first whole number of revolutions of the motor shaft turns the drum to move said information carrier a distance equal to 3x with respect to the printing members and wherein said transmission ratio, said drum radius and the thickness of the information carrier are so selected that for a second whole number of revolutions of said motor shaft during which the printer prints lines of one of said base colors the drum moves a location on said information carrier a distance equal to $2(\pi R)+x$ from the position at which said location was when said printer started printing said lines of said one base color whereby the printer can start to print lines of a different one of said base colors than the one it has just printed and wherein R is equal to the sum of the radius of said drum and the thickness of said information carrier, x is equal to the distance between two successive lines of different base colors in the printed color image and 3x is equal to the distance between two successive lines of the same base color in the printed color image.

2. A color printer as claimed in claim 1, wherein said transmission means includes a first worm connected to the shaft of said motor, a first worm wheel in engagement with said first worm, a second shaft on which is secured said first worm wheel, a second worm also secured on said second shaft and a second worm wheel connected to said drum, said second worm wheel cooperatively engaging with said second worm wherein the following relation exists $$(Z_2 \cdot Z_4 / Z_1 \cdot Z_3) = (2\pi R / 3x)$$

where $Z_1$ is equal to the number of threads on the first worm, $Z_2$ is equal to the number of teeth on the first worm wheel, $Z_3$ is equal to the number of threads on the second worm, and $Z_4$ is equal to the number of teeth on the second worm wheel.

3. A color printer as claimed in claim 2, wherein the following relation exists:

$$(Z_2 \cdot Z_4 / Z_1 \cdot Z_3) = (3N-1)/3$$

where $N = (2\pi R + x/3x)$ and is equal to the maximum number of printed lines per base color in the printed image.

4. A color printer as claimed in claim 2, wherein the following relation is satisfied:

$$(Z_2 \cdot Z_4 / Z_1 \cdot Z_3) = (1625/3)$$

and wherein x=0.07 millimeters.

5. A color printer as claimed in claim 2, wherein the following relation is satisfied:

$$(Z_2 \cdot Z_4 / Z_1 \cdot Z_3) = (1499/3)$$

and wherein x=0.07 millimeters.

6. A color printer as claimed in claim 1, wherein a thermal printing head holds said printing members and a strip engages said thermal printing head during printing, said strip being located between said printing head and said information carrier and having a separate area of each of said three different base colors.

* * * * *